May 9, 1950  J. VERGER  2,506,980
GRAIN GATHERING MECHANISM
Filed June 10, 1946  3 Sheets-Sheet 1

INVENTOR.
John Verger
BY
Merrill M. Blackburn
Atty

May 9, 1950  J. VERGER  2,506,980
GRAIN GATHERING MECHANISM
Filed June 10, 1946  3 Sheets-Sheet 3

INVENTOR.
John Verger
BY
Merrill M. Blackburn
Atty

Patented May 9, 1950

2,506,980

UNITED STATES PATENT OFFICE 2,506,980

GRAIN GATHERING MECHANISM

John Verger, Rock Island, Ill.

Application June 10, 1946, Serial No. 675,732

4 Claims. (Cl. 56—227)

This invention relates to improvements in grain harvesting machines, particularly that class of small grain combines generally referred to as "straight through" combines, in which the cut grain is delivered directly to the threshing cylinder by the same belt which receives the cut grain from the grain-gathering reel.

In most machines of this type using a conventional grain-gathering reel, the width of the grain swath is substantially equal to the length of the thresher cylinder. For reasons of practicability, the thresher cylinder is definitely limited to a moderate length. It follows therefore that, in a machine of this type, the grain swath must also be of a moderate width. Under normal harvesting conditions, the capacity of the combine will be increased directly in proportion to the increase in the width of the grain swath, and it is therefore desirable to cut a wider swath than the permissible length of the cylinder. However, when this is done, the grain cut by the outer portions of the sickle must be brought in toward the center of the machine to be delivered to the grain-conveying belt. Therefore, the purpose of this invention is to provide a means which will positively cause movement of grain from the sickle bar to the platform canvas, and more especially from the extreme ends of the sickle bar, in a machine which has a sickle bar substantially longer than the width of the platform canvas.

Another very important advantage of this invention is in the handling of windrowed grain. In many of the present "straight through" type of combines, due to the relative length of the thresher cylinders, great difficulty is encountered in handling windrowed grain. This invention will permit the use of a shorter cylinder and will thus greatly relieve the difficulty of choking or overfeeding the cylinder when threashing windrowed grain.

In the drawings annexed hereto and forming a part hereof:

Fig. 6 represents an elevation of the structure shown in Fig. 5.

Figure 1:
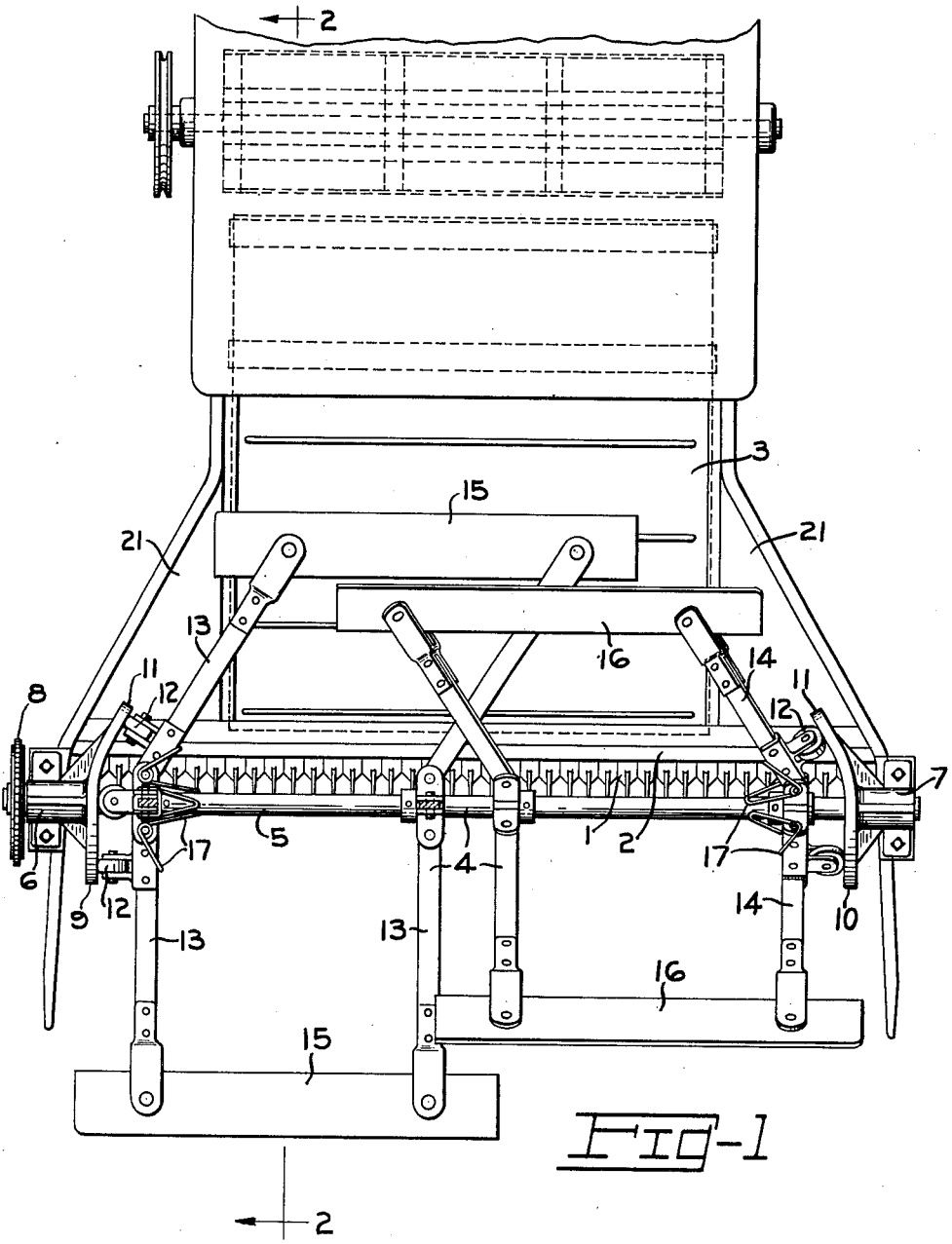
Fig. 1 is a plan view, partly in section, of the forward portion of a combine showing one form of reel embodying my invention.
Figure 2:
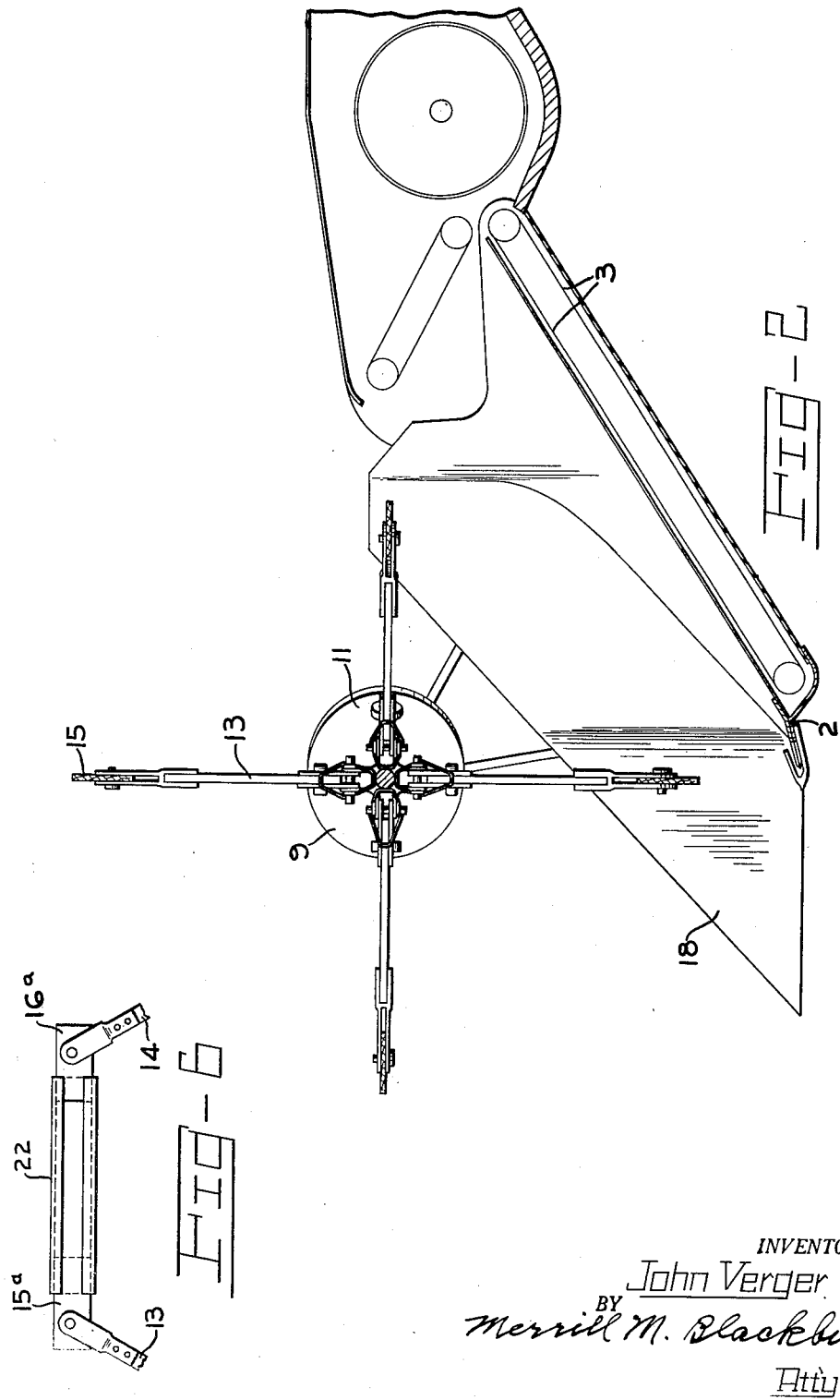
Fig. 2 represents a longitudinal, vertical section through the structure shown in Fig. 1 substantially along the plane indicated by the broken line 2—2 of that figure.

Reference will now be made in greater detail to the annexed drawings for a more complete description of this invention. The sickle 1 and sickle bar 2 are more or less conventional as is also the conveyor belt or apron 3. In the annexed drawings, the sickle bar is shown as much longer than the width of the belt 3, and the reel 4, when the bats are fully extended, is substantially the same length as the sickle bar. However, it is necessary to move the grain in from the outer ends of the sickle bar toward the middle of the combine in order to get it upon the belt 3. This is accomplished by the bats of the reel pushing the grain at the outer ends against the sides of the inclined platform 18. For approximately two-thirds of a revolution of the reel, the bats thereof will have an extreme span approximately the length of the sickle bar. Through the remainder of the revolution, in structures built according to Figs. 1 and 3, the bats will swing in so that they do not have such an extreme span and will clear or follow the platform sides. In a structure built according to Figs. 5 and 6, the same purpose is accomplished by having the bats extensible and contractile by being made of relatively slidable sections.

The reel shaft 5 is mounted in bearings 6 and 7 supported approximately above the sickle bar and driven by a sprocket wheel 8. These bearings 6 and 7 have at their inner ends guide plates 9 and 10 which have angularly arranged parts 11. These serve as actuators for the pulleys or rollers 12 carried by the outer arms 13 and 14 of the reel. At their outer ends, these arms 13 and 14 are pivotally connected to the reel bats 15 and 16 so that, as the arms swing inwardly and outwardly, the bats will be maintained at all times parallel to the shaft 5. Springs 17 are so arranged that they tend to hold the arms 13 and 14 extending outwardly from the shaft 5 in a radial direction, with the rollers 12 in engagement constantly with the guide plates 9. However, as the reel revolves about its shaft 5, the pulleys or rollers 12 engage the inclined parts 11 of the plates 9, and the arms 13 and 14 are caused to swing inwardly, as shown in Fig. 1. As the pulleys 12 leave the inclined parts 11, the arms swing outwardly again into positions substantially perpendicular to the shaft 5.

Figure 3:
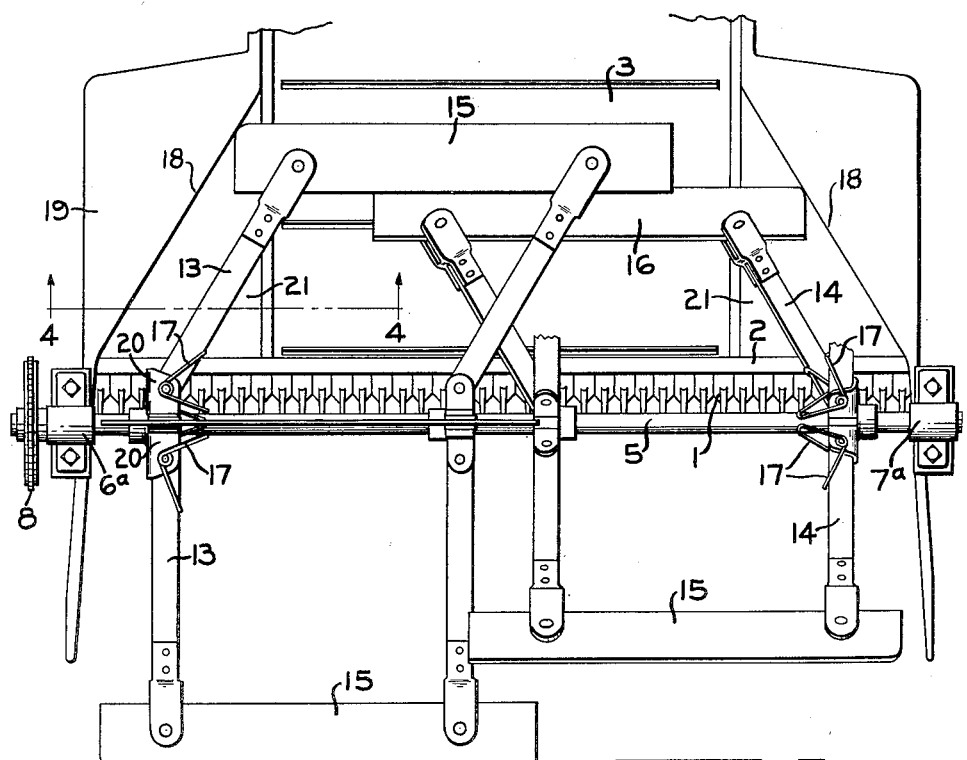
Fig. 3 is a fragmentary view showing a modified form of the structure shown in Fig. 1.
Figure 4:
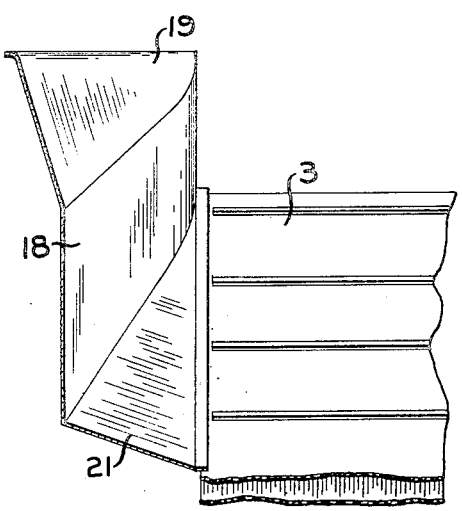
Fig. 4 represents a partial transverse section taken substantially along the plane indicated by the line 4—4, Fig. 3.

In the structure shown in Fig. 3, the parts 9, 10, 11, and 12 are dispensed with and the lateral movement of the bats is caused by their engagement with the forward portion 18 of the guide plates at the sides of the belt 3. As the reel rotates, the ends of the bats pass from the plates 18 to the inclined plates 19 and are permitted to swing outwardly under the influence of the springs 17. Their outward swinging is limited by the brackets 20, which are U-shaped in cross-section and within which the arms 13 and 14 are pivoted. The bats 15 can be made more effective in moving the grain sidewise and delivering it to the belt 3 if each is provided along its outer edge with a comb, already in public use for several years, the teeth of which are considerably separated. Grain dropping from the plates 18 will be guided to the belt 3 by the bottom plates 21, attached to the lower edges of the plates 18.

Figure 5:
Fig. 5 represents a plan view of a modified form of a reel bat.

In the form illustrated in Figs. 5 and 6, bats 15a and 16a replace the bats 15 and 16, being pivotally connected at their outer ends to the arms 13 and 14. These bats are arranged to slide longitudinally within a species of sleeve 22 which holds the bats together in side-by-side relation and permits longitudinal motion thereof as the arms 13 and 14 swing in and out about their pivots, during the rotation of the reel. Suitable means may be provided for preventing disconnection of the bats 15a and 16a from the sleeve 22. This means may comprise a pin projecting outwardly from the outer edge of each bat, said pins projecting into slots in the sleeves 22, extending longitudinally thereof. It is clear that this construction would have approximately the same functional variation of span as is present in the constructions described and shown in Figs. 1 and 3.

In this specification and the appended claims, the term "grain" is, for the sake of brevity, used in a broad sense to include not only grain in the ordinary means but also soy beans and grasses, such as clover, timothy, millet, and the like.

In the claims annexed hereto and forming a part hereof, the expression "the effective length of grain-contact surface of the grain-gathering means" and like expressions are used to refer to the width of the path through which the surface of the bats of the reel contacting the grain travel.

It is of course understood that the specific structures shown in the annexed drawings and described in the foregoing specification may be departed from without departing from the spirit of this invention as defined in the appended claims.

Having now described my invention, I claim:

1. In a grain-harvesting machine, a grain-detaching mechanism, a grain-conveyor mechanism adjacent thereto and rearwardly therefrom, said conveyor mechanism being substantially less in width than the length of the detaching mechanism, grain receiving and guiding platforms rearwardly from and adjacent to the outer ends of the grain-detaching mechanism, guiding means rising from said platforms and approaching said conveyor mechanism rearwardly from the grain-detaching mechanism, in combination with a grain-gathering reel supported above the detaching mechanism, said reel having radially extending arms pivotally supported on the reel shaft for swinging in a direction longitudinally of the reel shaft, reel bats carried by said arms and moving therewith inwardly transversely of the machine, and means for swinging said arms outwardly into radial position relatively to said reel shaft, the arms at opposite sides of the middle of the reel moving simultaneously in opposite directions and thereby carrying bat portions simultaneously in opposite directions and making the width of the path traversed by the bats unequal upon opposite sides of the axis of the reel.

2. In a grain-harvesting machine, a grain-detaching mechanism, a grain-conveyor mechanism adjacent thereto and rearwardly therefrom, grain receiving and guiding platforms rearwardly from and adjacent to the outer ends of the grain-detaching mechanism, guiding means rising from said platforms and approaching said conveyor mechanism rearwardly from the grain-detaching mechanism, in combination with a grain-gathering reel supported above the detaching mechanism, said reel having radially extending arms pivotally supported on the reel shaft for swinging in a direction longitudinally of the reel shaft, reel bats carried by said arms and moving therewith inwardly transversely of the machine, and means for swinging said arms outwardly into radial position relatively to said reel shaft, said guiding means rearwardly from the grain-detaching means serving as means to swing the arms transversely of the machine, bats upon opposite sides of the reel shaft being capable of independent movement relatively to each other.

3. In a grain-harvesting mechanism, in combination, a grain-detaching mechanism, a grain-conveyor mechanism adjacent thereto and rearwardly therefrom, a thresher cylinder substantially less in length than the length of the grain-detaching mechanism and located at the end of the grain-conveyor mechanism remote from the grain-detaching mechanism, grain supporting and guiding platforms rearwardly from and adjacent to the outer ends of the grain-detaching mechanism, guiding means rising from said platforms and approaching said conveyor mechanism rearwardly from the grain-detaching mechanism, a grain-gathering reel supported above the detaching mechanism, said reel having radially extending arms pivotally supported on the reel shaft for swinging in a direction longitudinally of the reel shaft, reel bats carried by said arms and moving therewith transversely of the machine, and means for swinging said arms outwardly into radial position relatively to said reel shaft, the figure defined by the outer ends of the reel bats being roughly semi-cylindrical upon one side of the reel axis and having its length on the opposite side of said axis much shorter than the length upon the first mentioned side thereof.

4. In a grain-harvesting machine having grain-cutting means and a grain-conveying belt, the combination of a grain-gathering reel and upstanding grain-guiding sides, spaced to form a grain-receiving opening substantially equal in width to the length of the grain-cutting means, extending rearwardly and forming a grain-passageway gradually diminishing in width and terminating in a grain-discharge opening substantially narrower than said grain-receiving opening, said reel having laterally movable bats pivotally carried by arms which are pivotally mounted on the axis of the reel, said bats during a part of their revolution being contained within the grain-passageway defined by the upstanding walls and during the remainder of their revolution extending at both sides of the reel to a greater distance than when they are between the upstanding walls.

JOHN VERGER.

(References on following page)

REFERENCES CITED

The following references are of record in the file of this patent:

UNITED STATES PATENTS

| Number | Name | Date |
|---|---|---|
| 470,061 | Lindley | Mar. 1, 1892 |
| 952,249 | Huddle et al. | Mar. 15, 1910 |
| 2,155,671 | MacGregor | Apr. 25, 1939 |

FOREIGN PATENTS

| Number | Country | Date |
|---|---|---|
| 619,156 | Germany | Sept. 5, 1935 |
| 620,846 | Germany | Oct. 28, 1935 |